Oct. 29, 1940.  W. N. HENDERSON  2,219,776
CRYSTALLIZATION PROCESS
Filed March 3, 1938
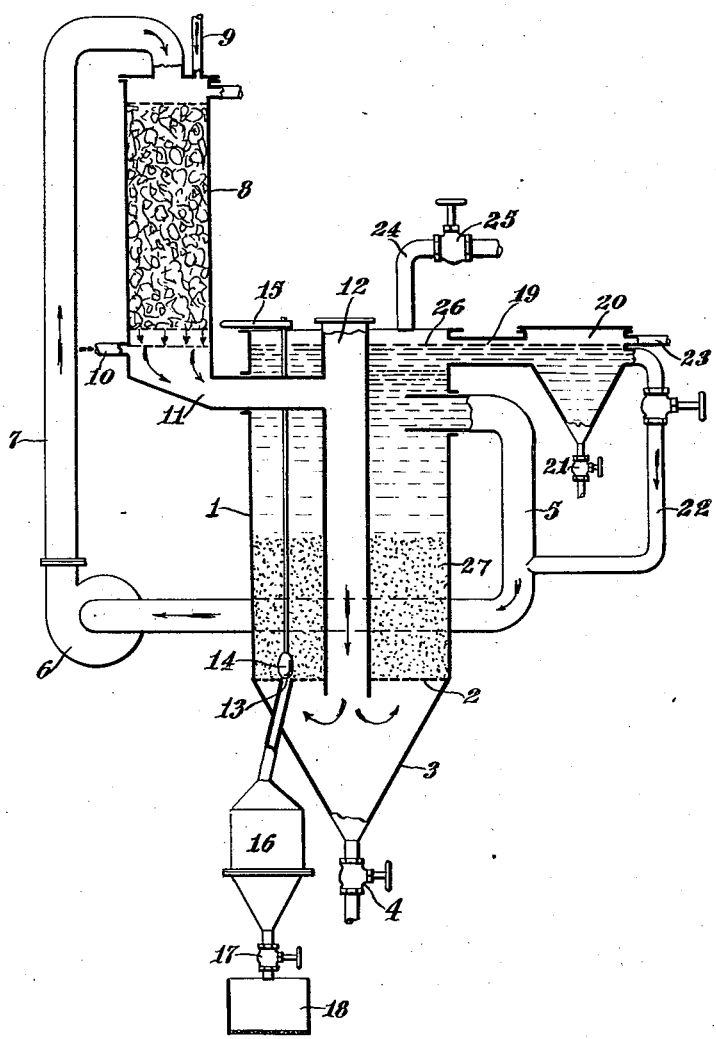
INVENTOR
William N. Henderson
BY
ATTORNEYS Patented Oct. 29, 1940

2,219,776

UNITED STATES PATENT OFFICE 2,219,776

CRYSTALLIZATION PROCESS

William Noland Henderson, Plainfield, N. J.

Application March 3, 1938, Serial No. 193,621

4 Claims. (Cl. 23—1)

This invention pertains to the production of crystallizable compounds in coarse granular form.

It has been known for some time to obtain crystallizable compounds in coarse granular form by passing a solution supersaturated with the compound through a mass or suspension of crystals thereof, whereby the supersaturation is deposited on the crystals causing them to grow to the size desired whereupon they are removed from the solution.

Usually this is accomplished by circulating the solution through a system containing a crystallizing chamber provided with a perforated bottom through which the solution is forced upwardly and above which is situated a bed of the growing crystals maintained in suspension during operation by the flow of the liquid. The system is continuously so operated that the solution is supersaturated with the crystallizable compound at some distance in advance of the crystalline suspension in the direction of circulation, and is then caused, while in this state, to pass into contact with the crystals whereby the supersaturation is deposited on the crystals as aforesaid. Care is taken in this connection to assure that the solution is not supersaturated beyond the limit of metastable solubility. In order to render the system continuous in operation, additional amounts of the compound must be added to the solution to replace that which is deposited on the growing crystals. Ordinarily the additional compound is added in the form of a saturated solution of the compound in the solvent employed in the system, but may be added in a solid or gaseous state.

In accordance with previous practices, supersaturation in such processes has always been accomplished, insofar as I am aware, either by cooling a saturated solution of the compound or by evaporation of some of the solvent or by a combination of these two. Cooling has been obtained either by refrigeration or by vaporization, the latter produced by example by means of evacuation; while evaporation has been produced either by heating or by means of evacuation as aforesaid, in which event the supersaturation results from the combined actions of both cooling and evaporation.

It will be observed that all of the above heretofore known methods of inducing supersaturation, necessitate the installation of auxiliary apparatus for purposes of refrigeration, evacuation, or heating, which not only increases both the initial outlay and the maintenance charges, but further requires considerable amounts of power for operation, thus adding to the operating overhead.

In contrast to the aforesaid known practices of inducing supersaturation by expenditure of energy on the solution, I have devised a radically new method of accomplishing this result which entirely eliminates the necessity for auxiliary apparatus of the character above referred to and which entails no expenditure of energy for inducing supersaturation.

Reference has been made above to the fact that in accordance with the known practices for producing crystallizable compounds in coarse granular form, additional amounts of the compound itself are added to the solution to replace that removed therefrom by deposit on the growing crystals. Ordinarily the compound is thus added, as stated, in the form of a saturated solution of the compound in the solvent, but the point I wish to emphasize is that it is the crystallizable compound itself which is added, and not other compounds which will react in solution to produce the crystallizable compound.

It is at this point that my invention departs basically from the principles heretofore known and practised in this art, in that in accordance with my invention I replace the crystallizable compound removed from the solution by deposit on the growing crystals, not by this compound, but by other compounds or components which do react in the solution to produce the crystallizable compound. And I introduce these components into the solution in such manner as to insure that they will react upon one another to produce the crystallizable compound in solution and not in crystalline form. By this procedure it becomes possible to concentrate the solution to such extent as to supersaturate the same with the crystallizable compound, solely by addition to the solution of the interacting components referred to, and without the use of auxiliary apparatus heretofore found requisite, such as refrigerating, evacuating or heating equipment. Furthermore, it will be observed that by my process no energy is expended in producing a state of supersaturation. In carrying out my process I, of course, take precaution to insure that the solution will not be supersaturated beyond the limit of metastable solubility.

The aforesaid novel principle of my invention, viz., that of introducing into the solution in interacting relation to each other, components which react therein to produce in solution in a state of supersaturation, the compound to be deposited on the crystals, may be put to economic advantage in many applications, as for example, the following: In the manufacture of synthetic nitrate of soda by reacting in aqueous solution, sodium carbonate and nitric acid, or sodium carbonate solution and the oxides of nitrogen which produce nitric acid in aqueous solution; in the manufacture of ammonium sulphate by reacting together in aqueous solution, sulphuric acid and aqua ammonia, or alternatively, as for example in the production of sulphate of ammonia as a byproduct in the production of coke, by introducing into the solution, sulphuric acid and ammonia gas, the latter obtained from coke oven gas, from which the tar and other extraneous elements have been removed; in the production of calcium nitrate by reacting in aqueous solution, nitric acid (or oxides of nitrogen which produce nitric acid in aqueous solution) and a calcium compound, such as the oxide or carbonate; in the production of ammonium chloride from ammonia and hydrochloric acid, by reacting aqua ammonia or ammonia gas in aqueous solution with the hydrochloric acid; or by similarly obtaining ammonium nitrate from ammonia gas or aqua ammonia and nitric acid; or ammonium carbonate from ammonia gas or aqua ammonia and carbonic acid; or carbonates of the metals such as sodium and calcium from carbonic acid and a soluble salt of these metals; and various other applications too numerous to list.

In order further to explain the invention in such manner that one skilled in the art will be able to practise the same, I take, for example, the production of coarse crystals of nitrate of soda, starting with sodium carbonate, water and the oxides of nitrogen produced and used in the synthesis of such nitrate.

In accordance with the known method of producing synthetic nitrate of soda, an aqueous solution of sodium carbonate is allowed to absorb oxides of nitrogen until a strong solution of nitrate of soda is produced. This is then concentrated by evaporation and the resulting crystals of nitrate of soda are dried. In this process the equipment is costly and the fuel cost is high.

By employment of my invention the reactions between sodium carbonate, water and the oxides of nitrogen (or nitric acid) may be carried out at atmospheric pressure, or if desired under partial vacuum, or under pressure. Furthermore, the process may be practised at any temperature ordinarily employed in crystallization processes. The type of apparatus will vary according to whether it is desired that the components react at atmospheric or at a higher pressure or under partial vacuum, or whether the process is to be used in connection with vaporization or refrigeration types of apparatus.

In the preferred modification, however, the process is carried out at atmospheric pressure by employment of apparatus such as that shown in the single figure of the accompanying drawing comprising a diagrammatic representation of the same.

Referring to the drawing, the apparatus is of a generally known construction with such modifications, however, as are required to adapt it to the production of crystallizable material in coarse granular form in accordance with the method of my invention. The apparatus comprises in its essentials: a crystallizing chamber 1 of cylindrical form provided with a bottom 2, perforated as indicated, such chamber terminating at its base in a funnel shaped closure 3 provided with an outlet valve 4. Chamber 1 is provided near the top with an outlet pipe 5 extending to a pump 6 and thence through a pipe 7 to the top of a reaction chamber or "trickle tower" 8 packed with chemically nonreactive material such as tile, grids or the like. The reaction chamber is provided at the top and at the base with inlets 9 and 10 for the purposes to be explained, and terminates at its base in a conduit 11 connecting with a conduit 12 extending axially through the crystallizing chamber 1 and opening at its base into the closure 3. The crystallizing chamber 1 is provided at its base with an outlet 13, normally closed by a lift valve 14 operated by a lever 15, the outlet 13 opening into a crystal box 16 for the reception of the coarse granular material, and provided in turn with an outlet valve 17 for depositing the contents into an open container 18 provided with a wire mesh bottom for draining and drying the same. The crystallizing chamber is also provided at the top with a relatively small outlet pipe 19 extending to a fine crystal separator 20 having a valve closed outlet 21 at its base for collection and removal of fine crystalline material circulating through the system, the clear solvent being returned to the system through a pipe 22. An overflow pipe 23 is provided to prevent rise of the solution above a desired level in chamber 1; and an inlet pipe 24 is also provided for running in additional solute when required, this being accomplished by operation of the control valve 25.

Referring to operation of the system in accordance with the invention, for the production for example as above stated, of coarse granular sodium nitrate, the system is filled to about the level 26 with an aqueous, substantially saturated solution of the sodium carbonate, and the pump 6 started. When the circulation has been established, oxides of nitrogen adapted to produce nitric acid in aqueous solution, are continuously introduced into the reaction chamber 8 through the inlet 10. As the oxides rise through the tower and meet the solution of sodium carbonate trickling down through the tower, a chemical reaction takes place whereby nitrate of soda is formed in solution. As this reaction proceeds a fresh supply of sodium carbonate is continuously added through the inlet 9 located at the top of the tower. The sodium carbonate and the oxides of nitrogen are introduced in the proper chemical ratio to produce nitrate of soda, which forms in the solution to render the same increasingly concentrated with the nitrate of soda, until the solution becomes saturated.

When this condition attains, solid nitrate of soda in the form of small crystals of about 0.3 millimeter diameter are introduced into the crystallizing chamber 1 to provide a bed 27 of the crystals resting on the perforated bottom plate 2. The oxides of nitrogen and the sodium carbonate solution will continue to react with the production of nitrate of soda until a state of supersaturation of the sodium nitrate exists in the solution passing downwardly through the reaction chamber, thence through conduit 11, and downward through the central conduit 12 to the funnel 3, thence upward through the perforated suspension bottom 2, and through the crystal suspension 24. The supersaturation will deposit on the crystals at this point and will cause them to grow to the desired size. These crystals are held in a state of suspension by the flow of the solution upward through the perforated bottom plate 2, and the crystals being in motion, remain separated and can be grown to any desired size between say 0.5 and 5.0 millimeters in diameter.

The solution on rising through the crystal suspension to the height of the outlet pipe 5 has given up its charge of supersaturation, and is now ready to be pumped back to the top of reaction chamber 8 through the pipe 5, and pump 6, and pipe 7, where it is again supersaturated by interaction of the sodium carbonate and oxides of nitrogen continuously introduced therein in carefully controlled proportions, through the inlets 9 and 10. Operation may be thus continuous so long as the reactants are added in the proper proportion to produce nitrate of soda, the temperature remains constant and the finished product removed from the system.

Removal of the granular crystals of desired size is accomplished by opening the lift valve 14, thereby permitting a portion of the crystals to descend into the crystal box 16, thence to be deposited in the container 18 through the outlet valve 17, the container being provided, as stated, with a wire mesh bottom to permit of draining and drying the crystals deposited therein.

In order to prevent any undue concentration of fine crystals in the circulating liquid, the fine crystal separator 20 is so disposed in the system, that a small portion of the solution is by-passed into this container by means of the inlet and outlet pipes 19 and 22, and the fine crystals thus settling to the bottom of the separator, removed therefrom through the outlet valve 21.

Experience will soon indicate the conditions best suited to a satisfactory production of a proper degree of supersaturation, in order not to exceed the limit of metastable solubility in the reaction chamber 8, during operation of the system and the production of a satisfactory and uniform crystalline product will be assured.

The same general type of apparatus shown in the drawing may be employed for the production in coarse granular form of any of the other crystallizable compounds above referred to, merely by employing the proper solution in the system and the proper crystal suspension in chamber 1, and introducing the reacting constituent through inlet such as 9 or 10 or both. For example in the manufacture of sulphate of ammonia from sulphuric acid and ammonia gas, the sulphuric acid is introduced through inlet 9 and the ammonia gas through inlet 10. In some instances it might be desirable or appropriate to introduce all of the reacting constituents into the reaction chamber in either gaseous, liquid or solid form, or any combination of these, in which event the reaction chamber and the inlets thereto would be modified accordingly.

What I claim is:

1. In a cyclic system employing a reaction chamber which is pipe-connected directly to a separate crystallizing chamber, for producing a crystallizable compound in coarse granular form from a solution thereof, the process which comprises: circulating a solution of said compound through said reaction chamber, continuously and without opportunity to remain or collect at any point therein, thence directly through said pipe and upwardly into said crystallizing chamber and through a bed of said crystals therein at a rate such as to maintain the lighter crystals which separate in suspension in said solution; introducing into said reaction chamber substances which react therein to produce said crystallizable compound in solution, the quantities of said substances so introduced being so regulated as to supersaturate said solution with said compound within the limit of metastable solubility before the solution leaves the reaction chamber but substantially without the formation of crystals therein; maintaining the solution so supersaturated as it circulates from the reaction chamber into the crystallizing chamber; maintaining the solution unchanged in temperature except for natural heating or cooling as it circulates from the reaction chamber through the crystallizing chamber and back to the reaction chamber, whereby said supersaturation is deposited on said crystals as the solution passes through the crystal bed; removing crystals retained in the solution passing out of the crystallizing chamber; and returning the solution to the reaction chamber sufficiently free from crystal nuclei to permit supersaturation therein as aforesaid.

2. In a cyclic system employing a reaction tower which is pipe-connected directly to a separate crystallizing chamber, for producing a crystallizable compound in coarse granular form from a solution thereof, the process which comprises: circulating a solution of said compound through said tower, continuously and without opportunity to remain or collect at any point therein, thence directly through said pipe and upwardly into said crystallizing chamber and through a bed of said crystals therein at a rate such as to maintain the lighter crystals which separate in suspension in said solution; introducing into said reaction tower gaseous and liquid substances which react therein to produce said crystallizable compound in solution, the quantities of said substances so introduced being so regulated as to supersaturate said solution with said compound within the limit of metastable solubility before the solution leaves the reaction tower but substantially without the formation of crystals in said tower; maintaining the solution so supersaturated as it circulates from the reaction chamber into the crystallizing chamber; maintaining the solution unchanged in temperature except for natural heating or cooling as it circulates from the reaction tower through the crystallizing chamber and back to the reaction chamber, whereby said supersaturation is deposited on said crystals as the solution passes through the crystal bed; removing crystals retained in the solution passing out of the crystallizing chamber; and returning the solution to the reaction tower sufficiently free from crystal nuclei to permit supersaturation therein as aforesaid.

3. In a cyclic system employing a reaction chamber which is pipe-connected directly to a separate crystallizing chamber having a perforated base, for producing a crystallizable compound in coarse granular form from a solution thereof, the process which comprises: circulating a solution of said compound through said reaction chamber continuously and without opportunity to remain or collect at any point therein, thence directly through said pipe and upwardly through said perforated base and through a bed of said crystals in said crystallizing chamber at a rate such as to maintain the lighter crystals which separate in suspension in said solution; introducing into said reaction chamber substances which react therein to produce said crystallizable compound in solution, the quantities of said substances so introduced being so regulated as to supersaturate said solution with said compound within the limit of metastable solubility before the solution leaves the reaction chamber, but substantially without the formation of crystals therein; maintaining the solution so supersaturated as it circulates from the reaction chamber into the crystallizing chamber; maintaining the solution unchanged in temperature except for natural heating or cooling as it circulates from the reaction chamber through the crystallizing chamber and back to the reaction chamber, whereby said supersaturation is deposited on said crystals as the solution passes through the crystal bed; removing crystals retained in the solution passing out of the crystallizing chamber; and returning the solution to the reaction chamber sufficiently free from crystal nuclei to permit supersaturation therein as aforesaid.

4. In a cyclic system employing a reaction chamber which is a pipe-connected directly to a separate crystallizing chamber, for producing a crystallizable compound in coarse granular form from a solution thereof, the process which comprises; circulating a solution of said compound through said chamber, continuously and without opportunity to remain or collect at any point therein, thence directly through said pipe and upwardly into said crystallizing chamber and through a suspension of said crystals therein at a rate such as to maintain the lighter crystals in suspension in said solution; introducing into said reaction chamber gaseous and liquid substances which react therein to produce said crystallizable compound in solution, the quantities of said substances so introduced being so regulated as to supersaturate said solution with said compound within the limit of metastable solubility before the solution leaves the reaction chamber but substantially without the formation of crystals in said chamber; maintaining the solution so supersaturated as it circulates from the reaction chamber into the crystalizing chamber; maintaining the solution unchanged in temperature except for natural heating or cooling as it circulates from the reaction chamber through the crystallizing chamber and back to the reaction chamber, whereby said supersaturation is deposited on said crystals as the solution passes through the crystal suspension; and returning the solution to the reaction chamber sufficiently free from crystal nuclei to permit supersaturation therein as aforesaid.

WILLIAM N. HENDERSON.